Figures 1, 2:
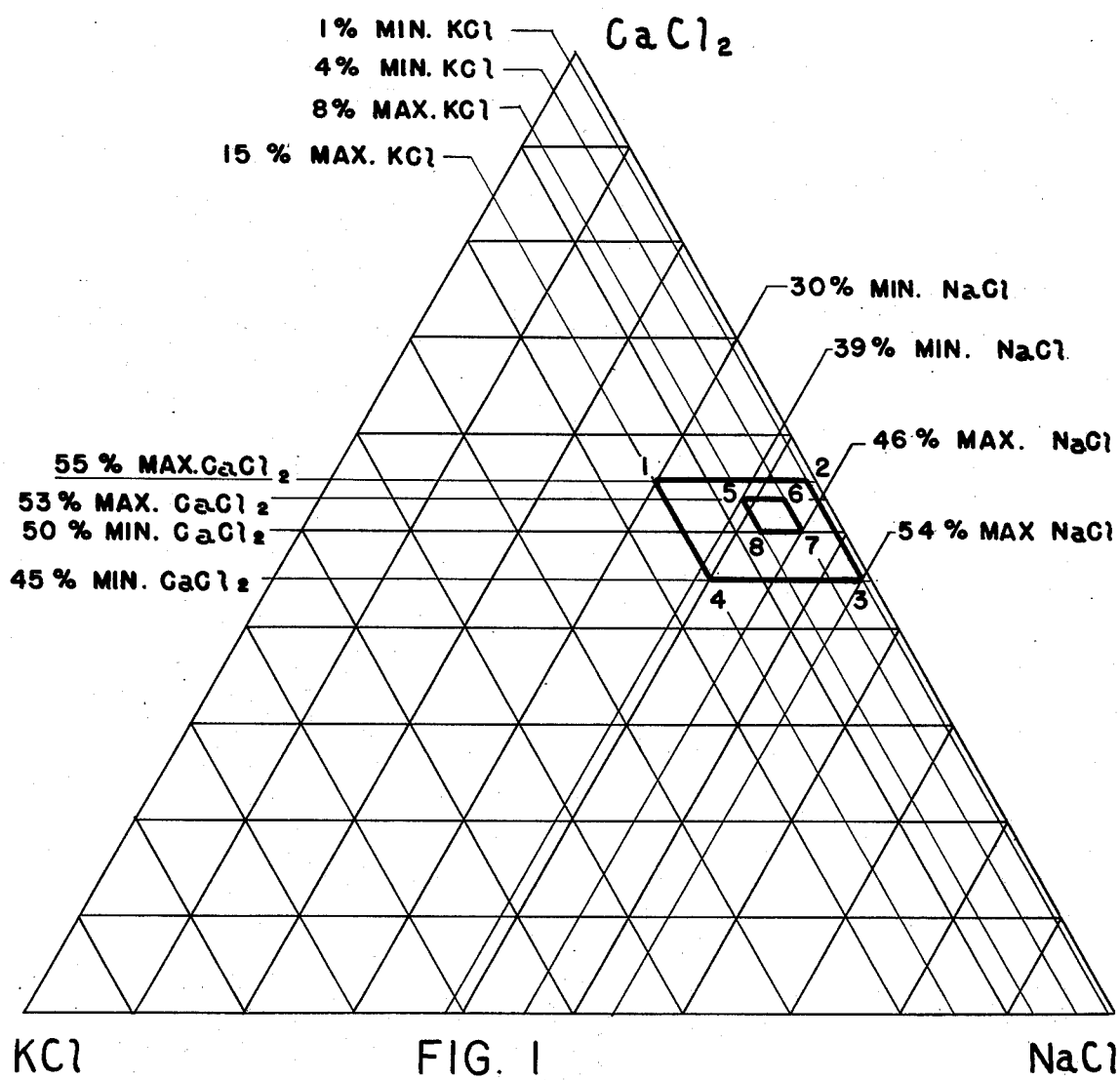

United States Patent [19]

Zellhoefer

[11] 4,065,604

[45] Dec. 27, 1977

[54] THERMAL CELLS AND ELECTROLYTE COMPOSITION THEREFOR

[75] Inventor: Glenn F. Zellhoefer, Normal, Ill.

[73] Assignee: National Union Electric Corporation, Stamford, Conn.

[21] Appl. No.: 406,543

[22] Filed: Jan. 27, 1954

[51] Int. Cl.[2] .................. H01M 6/30; H01M 6/18
[52] U.S. Cl. .................... 429/103; 429/112; 429/199
[58] Field of Search ............ 136/83.1, 84, 4 F, 4, 136/90, 153, 153.1, 153.5; 429/103, 112, 199

[56] References Cited

U.S. PATENT DOCUMENTS

| | | | |
|---|---|---|---|
| 856,162 | 6/1907 | Kitsee | 340/228 R |
| 2,595,814 | 5/1952 | Rich et al. | 322/2 R |

FOREIGN PATENT DOCUMENTS 740,001 11/1932 France.

OTHER PUBLICATIONS

International Critical Tables, vol. IV, pp. 41 and 81, 1st Ed., (1928), McGraw-Hill Book Co., Inc.

Primary Examiner—Leland A. Sebastian
Attorney, Agent, or Firm—Merriam, Marshall & Bicknell

EXEMPLARY CLAIM

1. An electrolyte for a fused electrolyte cell consisting essentially of a mixture of 45 to 55 mole percent of $CaCl_2$; 30 to 54 mole percent of NaCl; and 1 to 15 mole percent of KCl, containing proportions of each component substantially as determined by a three system diagram of such components; and a depolarizing agent.

10 Claims, 2 Drawing Figures

PERCENTAGE COMPOSITION BY WEIGHT

| POINT NO. | $CaCl_2$ | NaCl | KCl |
|---|---|---|---|
| 1 | 68.0 | 19.5 | 12.5 |
| 2 | 69.8 | 29.4 | 0.8 |
| 3 | 60.7 | 38.4 | 0.9 |
| 4 | 59.1 | 27.7 | 13.2 |
| 5 | 67.2 | 26.0 | 6.8 |
| 6 | 67.7 | 28.9 | 3.4 |
| 7 | 65.0 | 31.5 | 3.5 |
| 8 | 64.5 | 28.6 | 6.9 |

PERCENTAGE COMPOSITION BY WEIGHT

| POINT NO. | CaCl$_2$ | NaCl | KCl |
|---|---|---|---|
| 1 | 68.0 | 19.5 | 12.5 |
| 2 | 69.8 | 29.4 | 0.8 |
| 3 | 60.7 | 38.4 | 0.9 |
| 4 | 59.1 | 27.7 | 13.2 |
| 5 | 67.2 | 26.0 | 6.8 |
| 6 | 67.7 | 28.9 | 3.4 |
| 7 | 65.0 | 31.5 | 3.5 |
| 8 | 64.5 | 28.6 | 6.9 |

*INVENTOR.*
GLENN F. ZELLHOEFER
*BY*

THERMAL CELLS AND ELECTROLYTE COMPOSITION THEREFOR

This invention relates to thermal cells and electrolytes for use in such cells.

Known electrolytes consisting of various inorganic salts are quite hygroscopic. This entails considerable difficulty in the manufacture of thermal cells as the presence of moisture in the cells leads to rapid deterioration thereof.

I have discovered an electrolyte which is relatively non-hygroscopic as compared with known electrolytes, and which makes it possible to make a cell without any sacrifice in the performance thereof as compared with known cells. The electrolyte of my invention is hygroscopic to an extent comparable with that of ordinary table salt.

A principal object of the invention is to provide a new and improved thermal cell.

Another object of my invention is to provide a new and improved electrolyte for use in thermal cells.

Other objects and advantages of the invention will be apparent from a consideration of the following specification taken in conjunction with the accompanying drawing of which there is one sheet, and wherein:

FIG. 1 is a three system diagram showing the composition of electrolytes which come within the scope of the invention; and FIG. 2 is a chart showing the percentage composition by weight of the components of a number of electrolytes embodying the invention.

In thermal cells the electrolyte which is solid and non-conducting at all storage temperatures melts and becomes conducting when the cell is heated to some elevated temperature, and electrical energy may then be withdrawn from the system.

The invention contemplates an electrolyte for use in a thermal cell which consists essentially of a mixture of 45 to 55 mole percent $CaCl_2$, 30 to 54 mole percent NaCl, and 1 to 15 mole percent KCl; and wherein the mixture contains proportions of each component substantially as determined by a three system diagram of such components as shown in FIG. 1.

The parallelogram 1-2-3-4 indicates various proportions of $CaCl_2$, NaCl, and KCl which come within the range of my invention, while the parallelogram 5-6-7-8 indicates preferred proportions of such components.

According to one example the electrolyte contains 50 mole percent $CaCl_2$, 42 mole percent NaCl, and 8 mole percent KCl.

According to another example the electrolyte consists of 53 mole percent $CaCl_2$, 39 mole percent NaCl, and 8 mole percent KCl.

According to another example the electrolyte consists of 53 mole percent $CaCl_2$, 43 mole percent NaCl, and 4 mole percent KCl.

According to another example the electrolyte consists of 50 mole percent $CaCl_2$, 46 mole percent NaCl, and 4 mole percent KCl.

In FIG. 2 the table shows the percentages by weight of the compositions indicated by the numerals 1 through 8 inclusive of FIG. 1.

Not only is the electrolyte of my invention relatively non-hygroscopic, but the adsorbed moisture may be removed at 210°-220° C without deterioration of the electrolyte. A slurry of $V_2O_5$, aluminum phosphate and water painted or sprayed on electrolyte tape may be dried at 200°-210° C to remove the water and harden the depolarizer, thereby forming an adherent film of $V_2O_5$. Other depolarizers such for example as $MoO_3$ may be applied in a similar manner. Glass fiber tape impregnated with electrolyte of the foregoing composition and with $V_2O_5$ painted on one side was assembled in nickel-cadmium cells with the $V_2O_5$ coating adjacent to the anode. Such cells are easy to manufacture and have operating characteristics comparable to corresponding Ni/KCl-LiCl/Mg systems in which $V_2O_5$ or $K_2CrO_4$ was used as the depolarizing agent.

While I have described a preferred embodiment of my invention, it is capable of modification and I do not wish to be limited to the precise details set forth, but desire to avail myself of such changes as fall within the scope of the following claims.

I claim:

1. An electrolyte for a fused electrolyte cell consisting essentially of a mixture of 45 to 55 mole percent of $CaCl_2$; 30 to 54 mole percent of NaCl; and 1 to 15 mole percent of KCl, containing proportions of each component substantially as determined by a three system diagram of such conponents; and a depolarizing agent.

2. An electrolyte for a fused electrolyte cell consisting essentially of a mixture of 50 to 53 mole percent $CaCl_2$; 39 to 46 mole percent NaCl; and 4 to 8 mole percent KCl, containing proportions of each component substantially as determined by a three system diagram of such components; and a depolarizing agent.

3. A thermal cell embodying an electrolyte consisting essentially of a mixture of 45 to 55 mole percent $CaCl_2$; 30 to 54 mole percent NaCl; and 1 to 15 mole percent KCl, containing proportions of each component substantially as determined by a three system diagram thereof; and a depolarizing agent.

4. A thermal cell embodying an electrolyte consisting essentially of a mixture of 50 to 53 mole percent $CaCl_2$; 39 to 46 mole percent NaCl; and 4 to 8 mole percent KCl, containing proportions of each component substantially as determined by a three system diagram thereof; and a depolarizing agent.

5. A composition of matter suitable for use in a thermal cell comprising an electrolyte consisting essentially of a mixture of 45 to 55 mole percent $CaCl_2$; 30 to 54 mole percent NaCl; and 1 to 15 mole percent KCl, containing proportions of each component substantially as determined by a three system diagram of such components; and a depolarizing agent.

6. A composition of matter suitable for use in a thermal cell comprising an electrolyte consisting of a mixture of 50 to 53 mole percent $CaCl_2$; 39 to 46 mole percent NaCl; and 4 to 8 mole percent KCl, containing proportions of each component substantially as determined by a three system diagram of such components; and a depolarizing agent.

7. A thermal cell embodying an electrolyte consisting essentially of a mixture of 50 mole percent $CaCl_2$; 42 mole percent NaCl; and 8 mole percent KCl; and a depolarizing agent.

8. A thermal cell embodying an electrolyte consisting essentially of a mixture of 53 mole percent $CaCl_2$; 39 mole percent NaCl; and 8 mole percent KCl; and a depolarizing agent.

9. A thermal cell embodying an electrolyte consisting essentially of a mixture of 53 mole percent $CaCl_2$; 43 mole percent NaCl; and 4 mole percent KCl; and a depolarizing agent.

10. A thermal cell embodying an electrolyte consisting essentially of a mixture of 50 mole percent $CaCl_2$; 46 mole percent NaCl; and 4 mole percent KCl; and a depolarizing agent.